Aug. 7, 1945.  C. W. MOTT  2,381,553
CONTROL VALVE FOR FLUID-OPERATED SYSTEMS
Filed Aug. 30, 1943
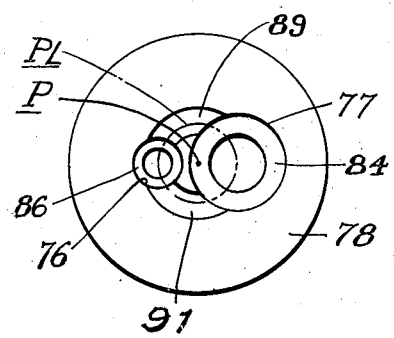
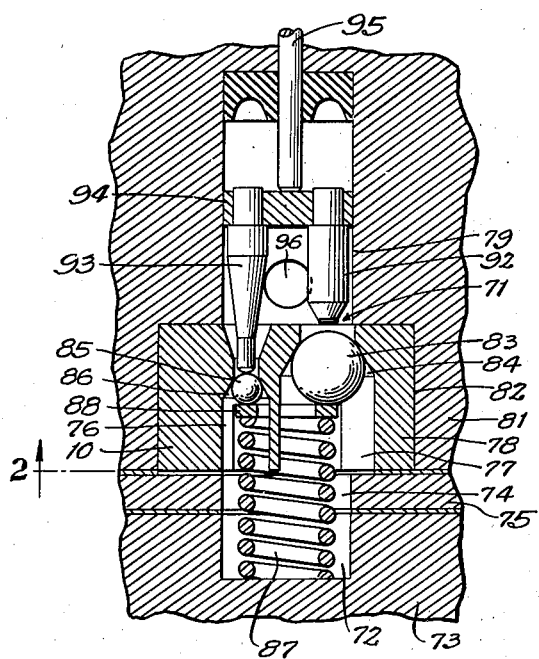
Inventor:
Carl W. Mott,
By Paul O. Pippel
Attorney.

UNITED STATES PATENT OFFICE 2,381,553

CONTROL VALVE FOR FLUID-OPERATED SYSTEMS

Carl W. Mott, La Grange, Ill., assignor to International Harvester Company, a corporation of New Jersey Application August 30, 1943, Serial No. 500,502

2 Claims. (Cl. 277—43)

This invention has to do with a valve employing successively openable elements.

A general object of the invention is the provision of a novel compact valve arrangement in which there is a principal valve member openable against pressure and an auxiliary valve member first openable to diminish the pressure and consequently the force necessary to open the principal valve.

An additional object is the provision of a valve arrangement as the aforesaid in which the auxiliary valve may be maintained open to a desired degree independently of the principal valve whereby a slow flow rate may be precisely selected.

A further object is the provision of a novel valve body or casing in which there are adjacent channels containing seats for valve members and an annular recess intersecting said channels to confine a spring for pressing each of the valve members upon their seats.

These and other desirable objects inherent in and encompassed by the invention will be more fully understood after reading the ensuing description with reference to the annexed drawing, wherein:

Fig. 1 is a sectional view taken axially through a form of valve embodying the principles of this invention; and Fig. 2 is an end view of a channelled block employed in the Fig. 1 embodiment and taken on the line 2 of Fig. 1.

With continued reference to the drawing the preferred embodiment therein shown comprises a chamber 71 formed by a recess 72 in a plate 73, a hole 74, a plate 75, bores 76 and 77 in a block 78, and a recess 79 in a block 81. The block 78 is seated in a countersunk portion 82 of the recess 79.

The primary valve in this embodiment comprises a spherical valve member 83 seatable upon a seat 84 at the upper end of the bore 77. The auxiliary valve comprises a spherical valve member 85 seatable upon a seat 86 at the upper end of the bore 76. These two valve members 83 and 85 are normally pressed against their valve seats by an helical spring 87, which reacts against the bottom of the recess 72 and against ring 88, which is interposed between the upper end of the spring and said valve members.

Said ring 88 and the upper end portion of the spring 87 are contained in part within arcuate recess portions 89 and 91, which are described or generated about a point P between the axes of the bores 76 and 77, and the radius of generation is such that the pitch line PL intersects the axes of said bores. The valve seats 84 and 86 are so spaced axially of the bores that the spherical valve members 83 and 85, while resting upon the seats, contact the ring 88 while this ring is disposed within a plane perpendicular to the bore axes.

Means for unseating the valve members comprises pins 92 and 93 having shank portions anchored within a small plate 94, which is movable axially within the discharge portion 79 of the valve chamber. A valve stem 95, when pushed downwardly against the plate 94, will first cause the pin 93 to engage and unseat the auxiliary valve member 85 with the same effect as hereinabove with respect to the auxiliary valve member 29. Further, downward displacement of the valve stem 95 will cause the pin 92 to engage and unseat the principal valve member 83. Fluid under pressure introduced into the valve chamber 71 below the valve members 83 and 85 will then be permitted to escape upwardly over the valve seats into the discharge portion 79 of the valve chamber, thence outwardly through a channel 96 to a desired point of delivery.

While I have herein shown and described a preferred embodiment of the invention, it should be understood that the invention extends to other embodiments, forms, modifications, structures, and details falling within the scope and spirit thereof and not sacrificing all of its material advantages.

What is claimed is:

1. In a valve, a chamber having bores with parallel axes and each bore having a valve seat over which fluid is escapable when the seat is uncovered, the side walls of said chamber having arcuate recesses generated about an axis between and parallel with those of the bores and of a radius to cause the pitch line of said recesses to substantially intersect the bore axes, valve members respectively for said seats, and a helical spring disposed mutually in said bores and said recesses to yieldably urge both of the valve members against their seats.

2. In a valve, a valve chamber having a fluid discharge passage means and bores with parallel axes and each bore having a valve seat over which fluid is escapable when the seat is uncovered, the side walls of said chamber having arcuate recesses generated about an axis between and parallel with those of the bores and of a radius to cause the pitch line of said recesses to substantially intersect the bore axes, valve members respectively for said seats, a helical spring disposed mutually in said bores and said recesses to yieldably urge both of the valve members against their seats, valve control members in said passage means and respectively projectable against the valve members to unseat them, and an operating member operable to successively press the valve control members against the valve members for unseating the same in sequence.

CARL W. MOTT.